US010284578B2

(12) United States Patent
Brugger et al.

(10) Patent No.: US 10,284,578 B2
(45) Date of Patent: May 7, 2019

(54) CREATING A MULTI-DIMENSIONAL HOST FINGERPRINT FOR OPTIMIZING REPUTATION FOR IPV6

(71) Applicant: International Business Machines Corporation, Armonk, NY (US)

(72) Inventors: Dominik W. Brugger, Kassel (DE); Matthias Seul, Kassel (DE); Volker Vogeley, Bad Sooden-Allendorf (DE); Gideon Zenz, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/450,232

(22) Filed: Mar. 6, 2017

(65) Prior Publication Data

US 2018/0255075 A1 Sep. 6, 2018

(51) Int. Cl.
*H04L 29/06* (2006.01)
*H04L 29/12* (2006.01)

(52) U.S. Cl.
CPC ...... *H04L 63/1416* (2013.01); *H04L 63/1441* (2013.01); *H04L 61/6059* (2013.01); *H04L 63/0245* (2013.01)

(58) Field of Classification Search
CPC .......... H04L 63/0227–63/0254; H04L 63/101; H04L 63/1416; H04L 63/1441; H04L 61/2503; H04L 61/6059
See application file for complete search history.

(56) References Cited

U.S. PATENT DOCUMENTS 8,214,490 B1  7/2012  Vos et al.
8,387,145 B2  2/2013  Xie et al.
8,689,328 B2  4/2014  Ormazabal et al.
(Continued)

FOREIGN PATENT DOCUMENTS

EP       2712144 A1     3/2014
WO    WO 2013/003493 A2  1/2013
WO    WO 2014/149607 A1  3/2014

OTHER PUBLICATIONS

Esquivel et al., On the Effectiveness of IP Reputation for Spam Filtering, IEEE, 2010.*

(Continued)

*Primary Examiner* — Minh Dinh
(74) *Attorney, Agent, or Firm* — Francis Lammes; Stephen J. Walder, Jr.; Jeffrey S. LaBaw (57) ABSTRACT A mechanism is provided for blocking IP connection addresses and prefixes. Header information is extracted from an incoming connection request. A determination is made as to whether a portion of an Internet Protocol address comprised in the header information is blacklisted. Responsive to a portion of the Internet Protocol address being blacklisted, a fingerprint is generated, and a determination is made as to whether the fingerprint is blacklisted. Responsive to the fingerprint being blacklisted, the underlying physical connection is dropped; data associated with the incoming connection request is stored in a buffer, the fingerprint is associated to the incoming connection request; the incoming connection request is merged with stored blacklisted requests of a related originating system; and shared prefixes of the Internet Protocol address of the stored blacklisted requests are filtered out.

20 Claims, 7 Drawing Sheets (56) References Cited

U.S. PATENT DOCUMENTS

| | | |
|---|---|---|
| 8,695,092 B2 | 4/2014 | Manianchira et al. |
| 8,832,832 B1 | 9/2014 | Visbal |
| 8,935,785 B2 | 1/2015 | Pandrangi |
| 2006/0221967 A1* | 10/2006 | Narayan ............... H04L 45/00 370/392 |
| 2008/0066161 A1* | 3/2008 | Ohhira ............. H04L 29/12801 726/4 |
| 2010/0229030 A1* | 9/2010 | Shouno ............ H04L 29/12273 714/5.1 |
| 2012/0020364 A1* | 1/2012 | Zinjuwadia ............ H04L 45/02 370/401 |
| 2014/0373141 A1 | 12/2014 | Yanovsky et al. |

OTHER PUBLICATIONS

Fukushima, Y. et al., "Proactive Blacklisting for Malicious Web Sites by Reputation Evaluation Based on Domain and IP Address Registration", IEEE, http://ieeexplore.ieee.org/xpl/login.jsp?tp=&arnumber=6120839&url=http%3A%2F%2Fieeexplore.ieee.org%2Fxpls%2Fabs_all.jsp%3Farnumber%3D6120839, 2011 IEEE 10th International Conference on Trust, Security and Privacy in Computing and Communications (TrustCom), IEEE Xplore Abstract. Nov. 16-18, 2011, 2 pages.

\* cited by examiner

FIG. 7

CREATING A MULTI-DIMENSIONAL HOST FINGERPRINT FOR OPTIMIZING REPUTATION FOR IPV6

The invention relates generally to a method for intrusion detection, and more specifically, to a method for blocking Internet Protocol connection addresses and prefixes. The invention relates further to a system for blocking Internet Protocol connection addresses and prefixes, and a computer program product.

Modern firewalls, intrusion prevention and "next-generation" security systems employ IP (Internet Protocol) based blocking to identify and thwart attack us before connection can be successfully established. This method may create an easy, safe and efficient way to block unwanted or malicious traffic at the gateway.

In order to achieve this, hosts' behavior is examined over a predefined timeframe with benign behavior, such as conducting expected business transactions, creating positive indicators, why is malicious behavior, such as conducting attacks for sending spam, may create negative indicators. These indicators may be collected, weighted by occurrence, internal potential impact and (if possible), success, forming an aggregate score or probability (depending on the used method). If the aggregate score reaches or sue parse is a given threshold value, the IP is considered malicious and may be blocked from communications with the network.

With the existing IPv4 networks, this approach was acceptable, because hosts usually have a single IP address to communicate with the outside world. Even if attackers are able to obtain new addresses, the connection "one IP address equals one host" remains. With the rise of IPv6 capability networks and participants, both, currently and in the next years, this situation will change.

IPv6 works with prefixes rather than single IP addresses for participants. Depending on the network, a participant may receive a /64 prefix, allowing a staggering amount of 18,446,744,073,709,551,616 addresses that may be assigned and used at the participant's discretion. Some providers even go one step further, offering larger prefixes (e.g., German telecom offers a /48 prefix with 1,208,925,819,614,629,174, 706,176 possible IP addresses—per participant) because more bits of the 128 bit IPv6 address are left to the user (12 bits more). Adding to this, is the ability for participants to switch prefixes (e.g., by reconnecting) multiplying the amount of addresses.

Due to the vast amount of addresses available, a participant may easily assign multiple addresses to a system and recycle them as will. Also, the introduction of IPv6 privacy extensions adds this behavior explicitly to the core functionality of IPv6 networks, a crippling any host with multiple IPv6 addresses by default.

Another addition to the IPv6 complications are providers that have no or just very limited IPv4 address portals and are thus developing dual-stack-lite solutions which put participants behind a central IPv4-NAT-Gateway (NAT=network address translation), making individual hosts difficult to distinguish. This differs from a usage of traditional proxy servers, as this behavior is enforced by the provider itself, thus mixing potential attackers with a large pool of legitimate customers.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for blocking Internet Protocol connection addresses and prefixes. The illustrative embodiment captures an incoming connection request to a target system. The illustrative embodiment extracts header information of the incoming connection request. The illustrative embodiment determines whether a portion of an Internet Protocol address comprised in the header information of the incoming connection request to the target system is blacklisted. Responsive to a portion of the Internet Protocol address being blacklisted, the illustrative embodiment generates a fingerprint based on structure and content of the incoming connection request and an underlying physical connection; and determines whether the fingerprint is blacklisted. Responsive to the fingerprint being blacklisted, the illustrative embodiment drops the underlying physical connection; stores data associated with the incoming connection request in a buffer; associates the fingerprint to the incoming connection request; merges the incoming connection request with stored blacklisted requests of a related originating system relating to the incoming connection request together with related fingerprint information; and filters out shared prefixes of the Internet Protocol address of the stored blacklisted requests if multiple Internet Protocol addresses have been detected for a same fingerprint and a predefined number of address bits of related incoming connection requests are identical.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'Internet Protocol connection' may denote a network connection between computing devices like, e.g., servers, gateways, routers, storage devices, host, mobile devices; basically any network device having a MAC (media access control) address may establish an IP-based connection.

The term 'addresses and prefixes' may denote target IP addresses and prefixes of these IP addresses in the sense of network addresses in Internet-Protocol-based networks. In particular, the IPv6 standard may allow a variable number of bits to be used as a prefix to host addresses. A part of these prefix bits may be used according to a definition of a network member, e.g., a device requesting a connection to another device.

The term 'capturing an incoming connection request' may denote "listening" to an incoming bit stream of an incoming network connection and determining a bit pattern known as a connection request. Such a capturing may be performed by an interceptor.

The term 'target system' may denote a network device which may be protected against attacks and potentially malicious connection requests. A target system may be anything from a router, a gateway, a host computer or, any other unit comprising a MAC (media access control) address. Also devices of the Internet of Things, i.e., sensor devices or actuator devices, e.g., for machine control, or other autonomous systems may be denoted as target system. In simple terms, a target system may be a system to be protected.

The term 'header information' may denote a part of a network packet—in particular, a portion in the beginning of a network packet—which may allow identifying the receiver how to treat the incoming network packet. Typically, the structure of data packets is standardized. This also holds for IPv4 and IPv6 address schemas. Basically, a header may refer to supplemental data placed at the beginning of a block of data—here the communication packet—being stored or transmitted. In data transmission, the data following the header may be called the payload or body. It is vital that header composition follows a clear and unambiguous specification or format, to allow for parsing. Such a parsing is performed by the already mentioned interceptor.

The term 'a portion of an Internet Protocol address' may denote the prefix, the host address or, the complete address information of the underlying IPv6 protocol.

The term 'blacklisted' may denote that a specific pattern—like an IP address of a prefix—may not be allowed to be processed further. If an address is blacklisted, the connection may be rejected a dropped.

The term 'fingerprint' may denote a specific data structure comprising a plurality of attribute values, e.g., metadata and characteristic data which may allow an identification of a more complex data structure. An advantage of fingerprinting may be in the fact that not a 1:1 identity may be required between different data structures—e.g., IPv6 addresses—in order to relate them to the same origin.

The term 'dropping' may denote that a connection request may be rejected without any additional notice. In contrast, a rejection of a connection request may also underlie a predefined protocol.

The term 'merging the request' may in general denote relating data regarding a connection request to already existing data—like fingerprints or fingerprint data—of one or more other connection requests. It can also mean reducing stored information by removing duplicated data or finding generalizations of received information through pattern analysis.

The term 'analysis container' may denote a virtual construct that consists of three components:

A list of known IPv6 addresses, IPv6 prefixes or host/connection fingerprints;

A set of payload captures extracted from received packages, typically limited to 5 payload captures per analysis container; and A general classification if the information stored in the container is to be considered harmful ('blacklisted') or neutral.

Newly received data—as part of communication packets—may be associated/merged with the analysis container through matching—potentially partial—against already contained IPv6 addresses, IPv6 prefixes, or host/connection fingerprint data.

The term 'IPv6 address' may denote an Internet Protocol Version 6 address (IPv6 address, standardized by the Internet Engineering Task Force (IETF) since 1998) which is a numerical label that is used to identify a network interface of a computer or another network node participating in an IPv6 computer network. —An IP address may serve the purpose of uniquely identifying an individual network interface of a host system, locating it on the network, and thus permitting a routing of IP packets between network devices. For routing, IP addresses are present in fields of the packet header where they indicate source and destination of the packet.

IPv6 is the successor to the first addressing infrastructure of the Internet, Internet Protocol version 4 (IPv4). In contrast to IPv4, which defined an IP address as a 32-bit value, IPv6 (IP version 6) addresses have a size of 128 bits. Therefore, IPv6 has a vastly enlarged address space compared to IPv4.

The term 'connection payload' may denote transported content of a data packet transmitted over a network.

The term 'malicious'—in particular malicious data packet—may denote a data packet with a potential to attack the system which may have received the malicious data packet. Malicious data packets may typically be sent to a receiving system in order to compromise the receiving system and use limitations of firewall systems to break into the attacked systems.

The proposed method for blocking Internet Protocol connection addresses and prefixes may offer multiple advantages and technical effects:

Due to the fact that when using IPv6 addresses traditional blacklisting individual IP addresses—like in the IPv4 case—becomes a resource intensive undertaking due to the sheer amount of possible combinations, the proposed concept may allow a limitation of required resources for blacklisting IPv6 addresses. Thus, the proposed concept may allow identifying attackers even if they may use dozens of IP addresses at the same time, such that the attacks may come from multiple IP addresses. Hence, the invention may solve the shortcomings of prior art by making a participant identifiable by a unique signature (fingerprint) comprised of host and connection behavior fingerprinting combined with a learning approach that may allow to isolate prefixes on a case☐by☐case basis which may then be used in blocking attackers.

This may reduce the amount of data to be stored as only the prefixes need to be recorded. Additionally, it makes the identification of individual attackers easier as generated signatures may be re☐used when evaluating an incoming, unknown connection.

The novel concept may also overcome the bottleneck that a simple blocking of /64 prefixes may be unreliable because subnets/prefixes offered differ heavily by provider. Additionally, the following problem is addressed: The development of the Dual-Stack-Lite-NAT-Gateway solutions puts many participants behind provider-owned gateways by default. Blocking network requests on the basis of "NAT-Gateway"/"proxy" connections or treating this as a negative factor in terms of criterions for a blacklisting will cause an increasing amount of legitimate customers being affected.

Thus, the proposed approach may have a substantially lower risk of blocking legitimate users as the prefix is determined on a case☐by☐case basis. Also the signature applies to a given host, so it may also be used to identify individual hosts behind a NAT gateway.

Simply put, the proposed solution enables recognizing of attacking hosts by way of fingerprinting attacking host's behavior, without the burden of storing each and every connection attempt which would increase storage requirements over-proportionally and potentially above all economical limits.

In the following, additional embodiments of the proposed method and system will be described:

According to one advantageous embodiment of the method, storing the received IP request data in the buffer also may comprise storing the prefix of the Internet Protocol address or the complete Internet Protocol address, and storing the related incoming packet payload. This way, the information regarding the incoming packets may be preserved for further correlation and attack analysis. It may be understood that the buffer may be a portion of the later discussed analysis container.

According to one preferred embodiment of the method, the fingerprint comprises metadata of the request, in particular connection request. The metadata may comprise at least one selected out of the group comprising a time received, source Internet Protocol address, a destination Internet Protocol address sequence number, size and fragmentation setting in the analysis container, which may be a part of the buffer, the kind of Internet Protocol packet—in particular SYN, ACK, FIN, RST—a used operating system and Internet Protocol stack of a sender, a source port number, a destination port number, an encryption cipher, a key length of encryption, an algorithm of encryption, a chain-of-trust of encryption, a layer 5+ protocol—e.g., HTTP, Torrent, FTP—a Web application protocol, and a content type and content classification. Thus, a plurality of characterizing data are used for a comparison of incoming connection request even if a direct identity of IP addresses for different connection requests may not be given. The fingerprint data are a comprehensive aggregation of data enabling an identification of attacking hosts even if they hide themselves behind fast changing prefixes.

According to one additionally preferred embodiment of the method, determining whether the portion of the Internet Protocol address may be blacklisted may comprise determining whether the Internet Protocol address itself or an included prefix is blacklisted. Thus, an initial check against unwanted connection is done also for only a portion of the IP address comprised in the incoming IP address.

According to a useful embodiment of the method, determining whether the fingerprint may be blacklisted comprises—in case the fingerprint is not blacklisted—determine whether the related request to the fingerprint not being blacklisted is malicious. In case the request is malicious the method may also comprise dropping the connection, and indicating the Internet Protocol address and the related prefix as blacklisted.

It may be noted that instead of a dropping the connection may also be rejected. A skilled person may understand that a rejection is an active part of the rejecting party with its own protocol, whereas a dropping may delivery less information for an intruder.

According to one permissive embodiment of the method the Internet Protocol address may be an IPv6 address. Hence, with the proposed method extended intrusion detection methods may be implemented for IPv6 in which traditional IPv4 network protection methods may no longer be sophisticated enough.

According to one advantageous embodiment of the method, the predefined number of address bits may be at least 32 bit long, wherein a related comparison of Internet protocol addresses starts from the left side of the Internet Protocol address. Thus, the structure of IPv6 addresses—in particular that the IP addresses start with a variable prefix—is completely reflected in the method.

According to a further preferred embodiment of the method, the analysis container may be kept in memory until the connection is dropped—e.g., due to a non-allowed connection or attack—or a given amount of time may have passed after a last writing into the analysis container. This may be, e.g., a couple of minutes like, 30 min, 60 min or, any predefined amount of time. This may help to reduce the amount of data stored for supervising incoming connection requests.

According to one further preferred embodiment of the method, merging the request with already stored blacklisted requests may comprise building a joint analysis request record if the request and the already stored blacklisted requests have the same address—in particular the complete host address. Payload portions of the request may be stored in a chained manner even if related sequence numbers are not successive numbers. This means that gaps in the sequence numbering schema may be allowed. An intruder may have selected to have gaps in the sequence numbering in order to confuse advanced firewalls.

According to an enhanced embodiment, the method may also comprising determining whether a connection payload of the request is malicious and dropping the connection and indicating IP address and prefix or fingerprint as blacklisted on a positive outcome of the determination. Thus, also traditional IPv4 methods may be included into the advance concept proposed here.

In the following, a detailed description of the figures will be given. All instructions in the figures are schematic. Firstly, a block diagram of an embodiment of the inventive method for blocking Internet Protocol connection addresses and prefixes is given. Afterwards, further embodiments, as well as embodiments of the system for blocking Internet Protocol connection addresses and prefixes, will be described.

Figure 1:
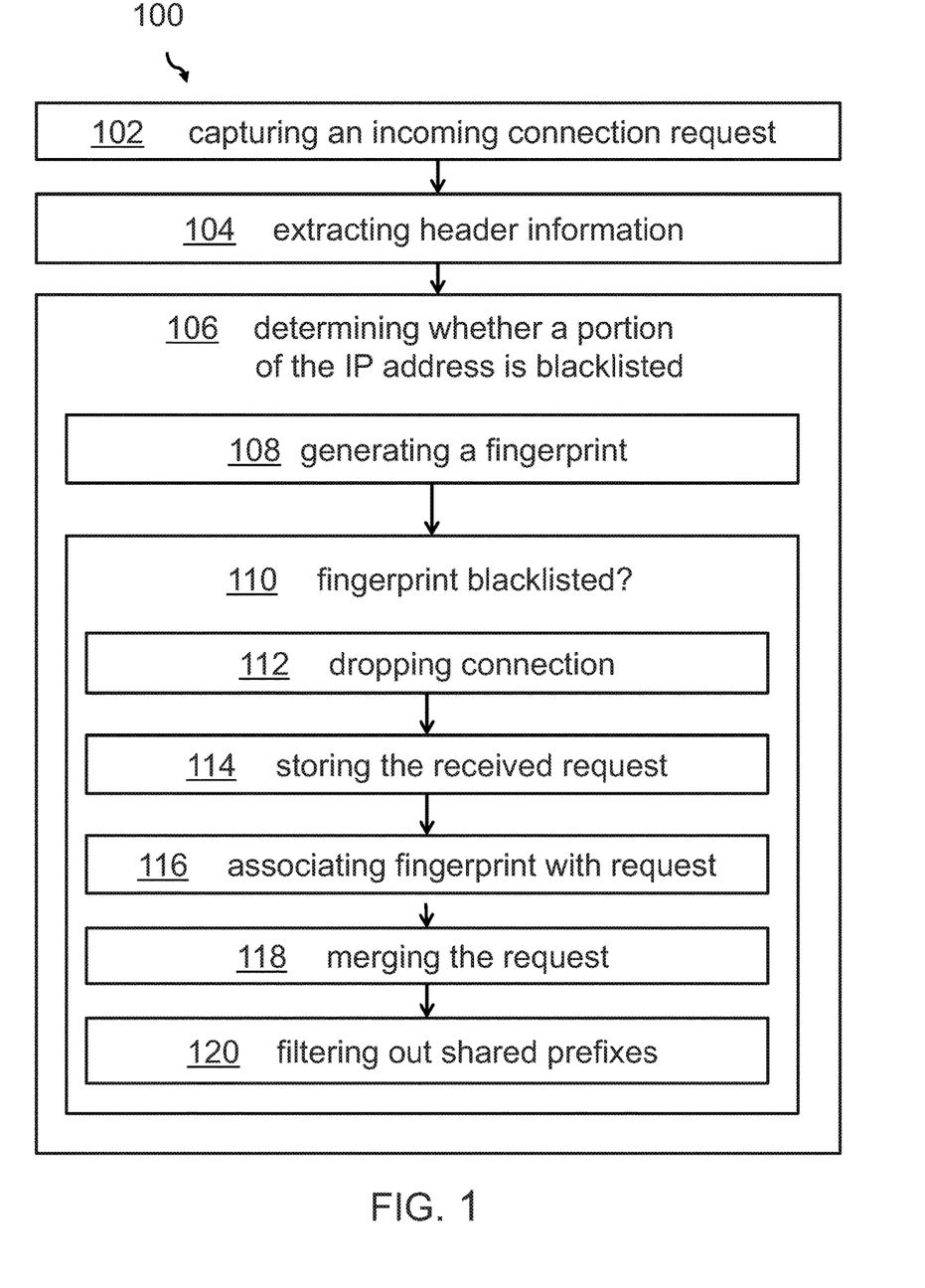
FIG. 1 shows a block diagram of an embodiment of the inventive method for blocking Internet Protocol connection addresses and prefixes.

FIG. 1 shows a block diagram 100 of an embodiment of the computer-implemented method for blocking Internet Protocol connection addresses and prefixes. The method comprises capturing, 102, an incoming connection request to a target system, in particular from another potentially attacking system; extracting, 104, header information of the incoming connection request; and determining, 106, whether a portion of an Internet Protocol address—in particular a host address, a complete address, or a prefix of the address—comprised in the header information of the incoming connection request to the target system is blacklisted. This may be done by a connection interceptor using an IP reputation database.

In case a portion of the Internet Protocol address—in particular the IP address or prefix—is blacklisted, the method comprises generating, 108, a fingerprint—to be precise, fingerprint data about involved systems (metadata) in the connection—based on structure and content of the request and the underlying physical connection; and determining, 110, whether the fingerprint is blacklisted.

If that is the case, the method comprises dropping, 112—or rejecting which may include a specific response—the underlying connection; and storing, 114, the received request data about the request in a potentially temporary buffer. The buffer may be a portion of an analysis container. It may be possible to store all available information about a specific connection request. Optionally, only the first couple of bites of the connection request data may be stored in order to save memory space.

The method comprises further—in case the fingerprint is blacklisted—associating, 116, the fingerprint to the request, meaning that entries in two storage containers—a connection request container and a fingerprint container—may be linked to each other to build a 1:1 relationship.

The method comprises further merging, 118, the request with already stored blacklisted requests—in particular related fingerprint data—of the related originating system relating to the request together with related fingerprint information. In practical embodiments, e.g., the last 5 addresses with fingerprints may be kept for storage efficiency.

A further step in the method is filtering out, 120, shared prefixes of the Internet Protocol address of the stored blacklisted request if multiple Internet Protocol addresses have been detected with the same fingerprint and a predefined number of address bits of the related request are identical. The comparison may start from the left side of the IPv6 address, i.e. the prefix side. Also this may help to save required storage space.

Figure 2:
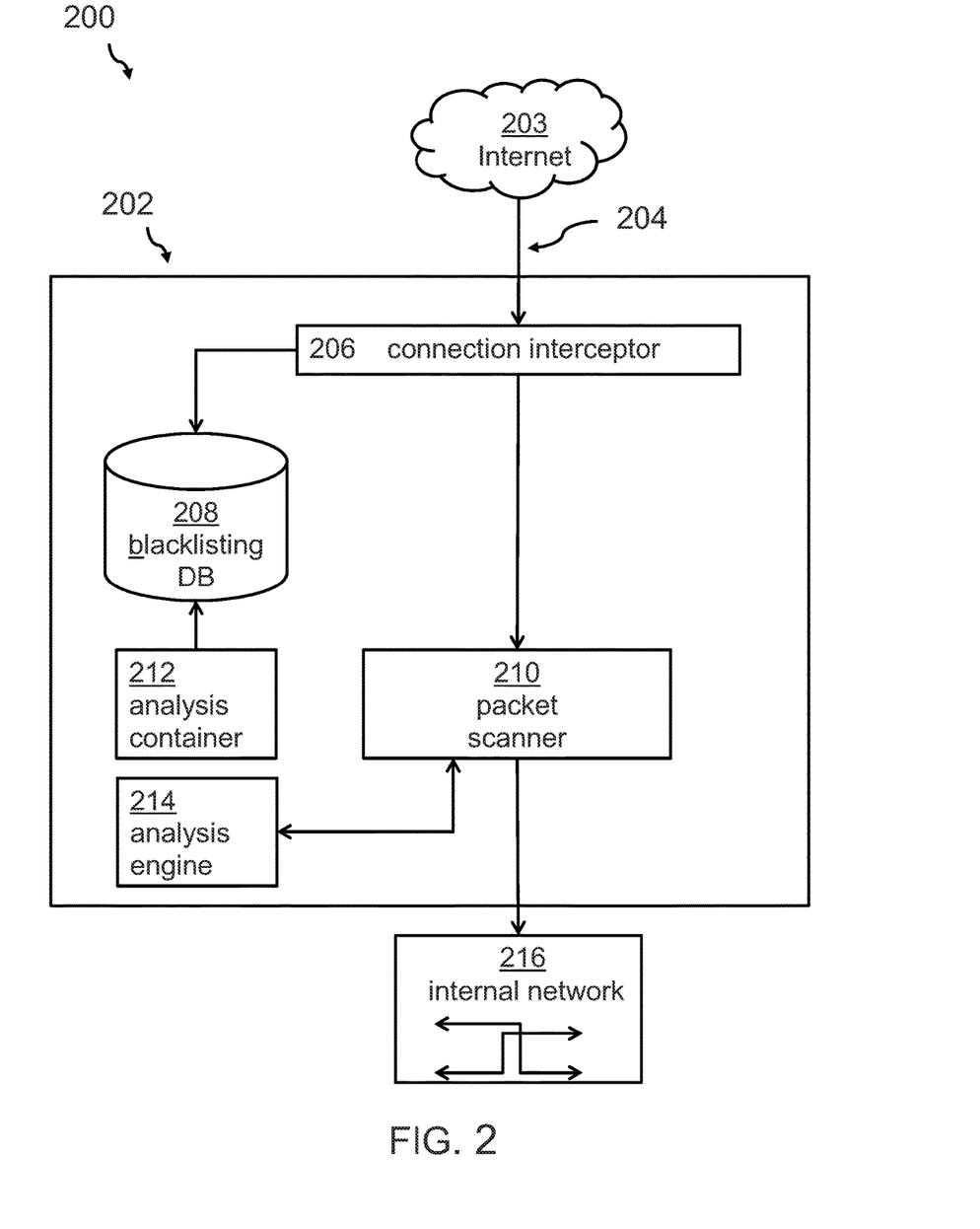
FIG. 2 shows a block diagram of an embodiment illustrating of the concept of the enhanced content aware firewall.

FIG. 2 shows a block diagram 200 of an embodiment illustrating of the concept of the enhanced content aware firewall 202. In incoming connection 204 via, e.g., the Internet 203, is directed to the connection interceptor 206. Generally, the inventive concept may be implemented as a series of components to be either installed as a stand-alone IP reputation firewall or a component of a next generation security product or a software development kit.

The connection interceptor 206 is triggered whenever a new connection is being established. In this case, the connection interceptor 206 will check in an IP reputation database 208 if the incoming connection 204 is tied to a blacklisted IPv6 prefix, i.e., look-up the prefix in a B-tree index until a leaf is reached. If this is the case, the connection will be immediately rejected or dropped. It may be understood that in other mentioning of the term "reject" the term "drop" may be an alternative.

In case the prefix is not blacklisted, the connection will be allowed to establish the connection. The interceptor 206 continues to be active as long as the connection is open, to capture packets going through the stream.

All captured packets and a connection ID (identifier) are relayed to a package scanner 210 component which will silently accept and process unless a situation has occurred that requires the connection to be dropped or rejected. If this case arises, the connection interceptor 206 will receive an asynchronous call back to react (usually terminating the connection).

The package scanner 210 receives the incoming data stream with a connection IP included.

Next, an analysis container 212 is checked. An analysis container 212 is identified by the connection IP address and the received prefix, which also is the host fingerprint. If the analysis container 212 retrieved is marked as blacklisted, the connection 204 will be dropped.

Next, the packet scanner 210 will record the packet details to generate the connection fingerprint. The connection fingerprint consists of all relevant metadata of the connection or derived thereof as detailed in the following list:
  time received;
  source IP;
  destination IP;
  sequence number;
  size and fragmentation setting in the analysis container;
  kind of IP packet (e.g., SYN/ACK/FIN/RST);
  operating system and IP stack of sender;
  destination port;
  source port;
  encryption cipher, key length, algorithm, chain-of-trust;
  layer 5+ protocol (e.g., HTTP, Torrent, FTP);
  web application control; or
  content type and classification.
An example may be:

| Item | Source of information |
| --- | --- |
| time received 2016☐07☐12T10:38Z | System TCP stack |
| sequence number 0 | IP header information |
| destination port 25 | IP header information |
| source port 48921 | IP header information |
| size 43 bytes | IP header information |
| packet type SYN | IP header information |
| OS Windows NT | pattern matching e.g., with p0f, https://en.wikipedia.org/wiki/P0f |

The packet scanner 210 will check if prior packets have been recorded for this analysis container 212. If this is the case, it will do a connection fingerprinting check on all packets in the analysis container 212 to determine if a similar connection behavior has been seen in another analysis container. This may imply that a given percentage of data points are within a given area of overlap, e.g., (a) the timestamps are within the same minute and to used protocol 80% is the same or (b) the ports are within a ±1000 boundary. If this is the case, the process will merge the two, thereby detecting if a host moves between prefixes. Here, a new, shorter, shared (provider) prefix is computed by logical "and-ing" both prefixes, and a new analysis container is created that contains all data from the two similar analysis containers. This enables the system to self-learn the correct prefix size for detected hosts. The analysis engine 214 works in cooperation with the package scanner 210 to achieve these tasks. After a query from the packet scanner 210, the analysis engine 214 checks for malicious content and reports the findings back to the packet scanner 210.

If a matching connection fingerprint has been blacklisted, the package scanner 210 will signal the connection interceptor 206 to drop the connection. It will furthermore log the incident alongside all information in the related analysis container.

All analysis containers would keep a limited number of packets received (e.g., the last 32 packets), dropping in a FIFO manner (first in, first out) if new packets arrive to keep the memory footprint low. If the system resources allow it, the packet limit can be increased.

All analysis containers will be kept in memory either until the connection is dropped due to detecting an attack or if a given amount of time has passed (e.g., 60 minutes).

If the incoming connection 204 has been determined not to be malicious, a connection to the internal network 216 is established.

Whenever analysis containers 212 are merged, the packet scanner 210 will determine if there are similarities (equal bits from left to right) in the prefixes used. If enough addresses have been collected (e.g., 5 addresses) it will determine the stable part of the prefix, declare this the "main prefix" to be used to identify the participant behind it. This main prefix will be used for blacklisting connections if the need arises. A selection of addresses will be kept (e.g., the last 5) for reference purposes, if a new address is detected that does not align with the "main prefix" and a re-determine the stable prefix part is performed.

Alongside the prefixes, the host and connection fingerprints will be kept to have more identifiers for a given participant is needed.

Figure 3:
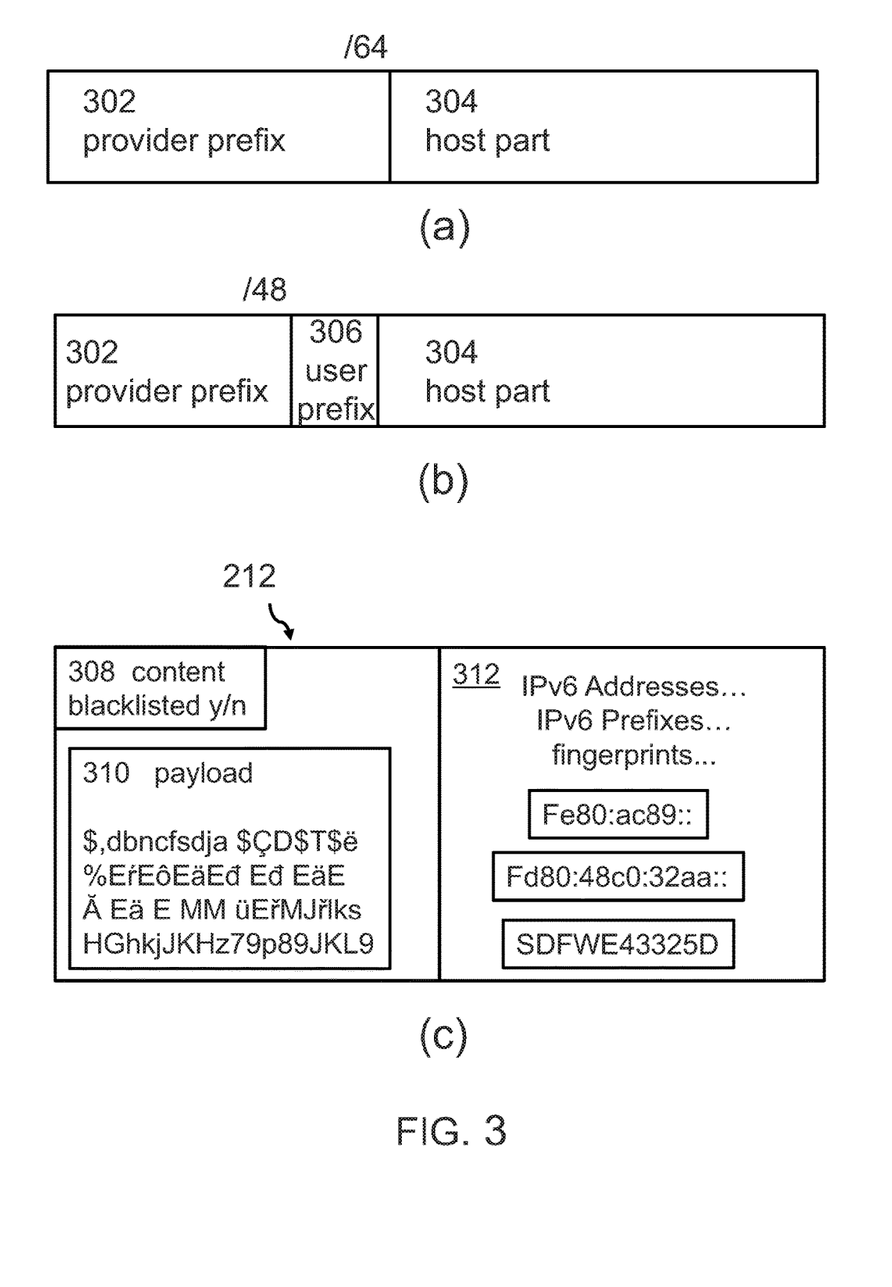
FIG. 3a, 3b show the IPv6 structure for a comprehensive understanding of the proposed concept.
FIG. 3c shows an embodiment of an analysis container.

FIG. 3a and FIG. 3b show the IPv6 structure for a comprehensive understanding of the proposed concept. It may be noted, that the prefix length is not standardized and can vary among different Internet service providers. FIG. 3a shows a structure with a /64 provider prefix 302 without a user prefix part and a host part 304. The host part 304 comprises also 64 bits. FIG. 3b shows a structure with a /48 provider prefix part 302, a user prefix part 306 and a host part 304 (again 64 bit long). As known by a skilled person, IPv6 addresses are written in hexadecimal code (IPV4 decimal), wherein the number is typically broken in 16 bits (4 hex-numbers). An example would be: 2003:0db8:76e3: 05d3:1329:8a2e:0407:7344. I.e., each 4-digit-block represents a 16-bit-address part.

FIG. 3c shows an embodiment of the analysis container 212. It comprises a flag 308 whether the content is blacklisted, as well as the payload 310 of one or more the communication packet(s). On the other side, it comprises one or more IPv6 addresses, one or more IPv6 prefixes and one or more fingerprint data—all summarized as reference numeral 312.

Figure 4:
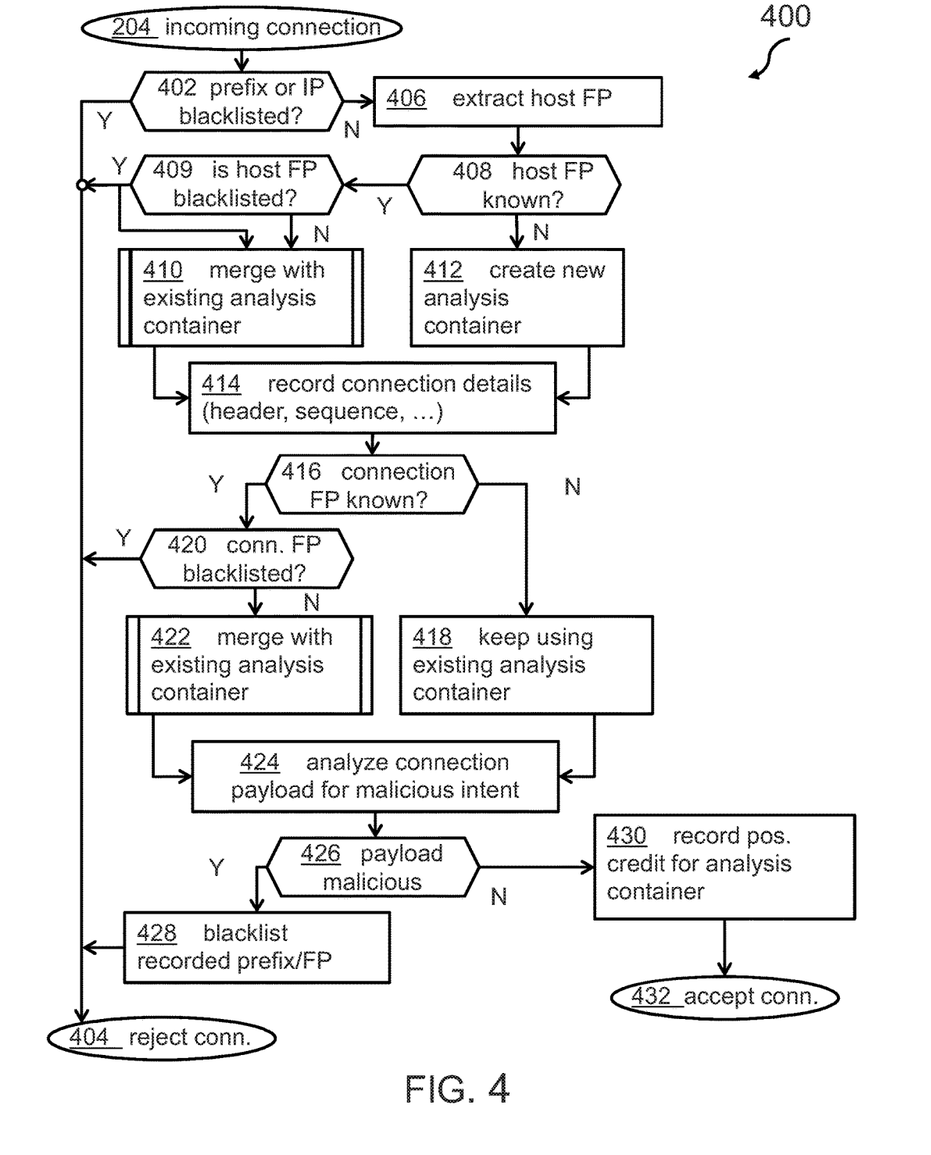
FIG. 4 shows a flowchart of a classification workflow detailing the flow of actions performed in the enhanced content-aware firewall of FIG. 2 for incoming connection attempts.

FIG. 4 shows a flowchart 400 of a classification workflow detailing the flow of actions performed in the enhanced content-aware firewall 202 of FIG. 2 for incoming connection attempts.

In general, the connecting universal signature (fingerprint) with attackers may be understood in the following way: the actual scanning for attacks can occur in a state-of-the-art fashion employing any number of detection methods such as intrusion, spam of malware detection solutions. If the solutions detect an attack, the behavior differs from existing implementations in that they will not cause the IP address itself to be blocked, but instead the offended IP address analysis package is located in the packet scanner's memory.

Blacklisting will then occur following a staggered method: firstly, the actual attacking IP address will be blacklisted, which gives feature-parity with IPv4 reputation blocking. Secondly, the "main prefix" (if available yet) will be blacklisted (stage II); thirdly, the combination of host plus connection fingerprints will be blacklisted (stage III).

If an attack is occurring the first time, the proposed approach with be identical to IPv4 reputation blocking, just covering the offending IP address itself. If the attacker does not change IP addresses, this approach will work just as before.

However, if the attacker employs multiple IP addresses at the same time or is quickly changing the IP addresses within the available prefix range, stage II and stage III with be activated.

As only a selection of the last few attacking IP's for the given recipient is kept, the required memory footprint remains low while still providing ample protection using the generalized "main prefix" and combinations of host/connection fingerprints.

The related flowchart of FIG. 4 shows this in detail the classification and learning workflow: the incoming connection 204 attempt will be checked, 402, whether the prefix of the IP address is blacklisted. In case of "yes" at 402, the connection will be rejected—or dropped—immediately, 404.

In case of "no" at 402, the host fingerprint will be extracted, 406. Then it will be determined whether the host fingerprint is already known, 408. In case of "yes" at 408, it is determined, 409, whether the host fingerprint is blacklisted. In case of "yes" at 409, the connection is rejected, 404. However, the flow also continues to box 410 because also from such a case potential important intrusion information may be derived for future connections. The analysis continues in parallel to the rejection as if the determination step 409 would have resulted in "no".

In any case, in the next step is the fingerprint is merged, 410, with an existing analysis container for the host fingerprints. In case of "no" at 408, a new analysis container is created, 412. After both steps, 410, 412, connection details (e.g., header, sequence, or the like) are recorded, 414. It may be noted that the step of merging the fingerprint with already existing fingerprint data is detailed in FIG. 5.

In step 416, it is determined whether the connection fingerprint is already known. If that is not the case—"no" at 416—the process will keep using, 418, the created analysis container. In case of "yes" in the determination step 416, it will be determined, 420, whether the connection fingerprint is already blacklisted. In case of "yes" at 420, the connection will be rejected immediately, 404. In case of "no" at 420, a merge, 422, with an existing analysis container and the reputation database for the connection fingerprint will be performed.

After the steps 418 and 422, the connection payload is analyzed, 424, for malicious content (i.e., connection attack). This will be determined in determination step 426. If the payload is determined to be malicious—"yes" at 426—the recorded prefix/fingerprints are blacklisted, 428, and the connection is rejected, 404. In case of "no" of the determination of step 426, a positive credit is recorded, 430, for the related analysis container and the connection is accepted, 432.

Figure 5:
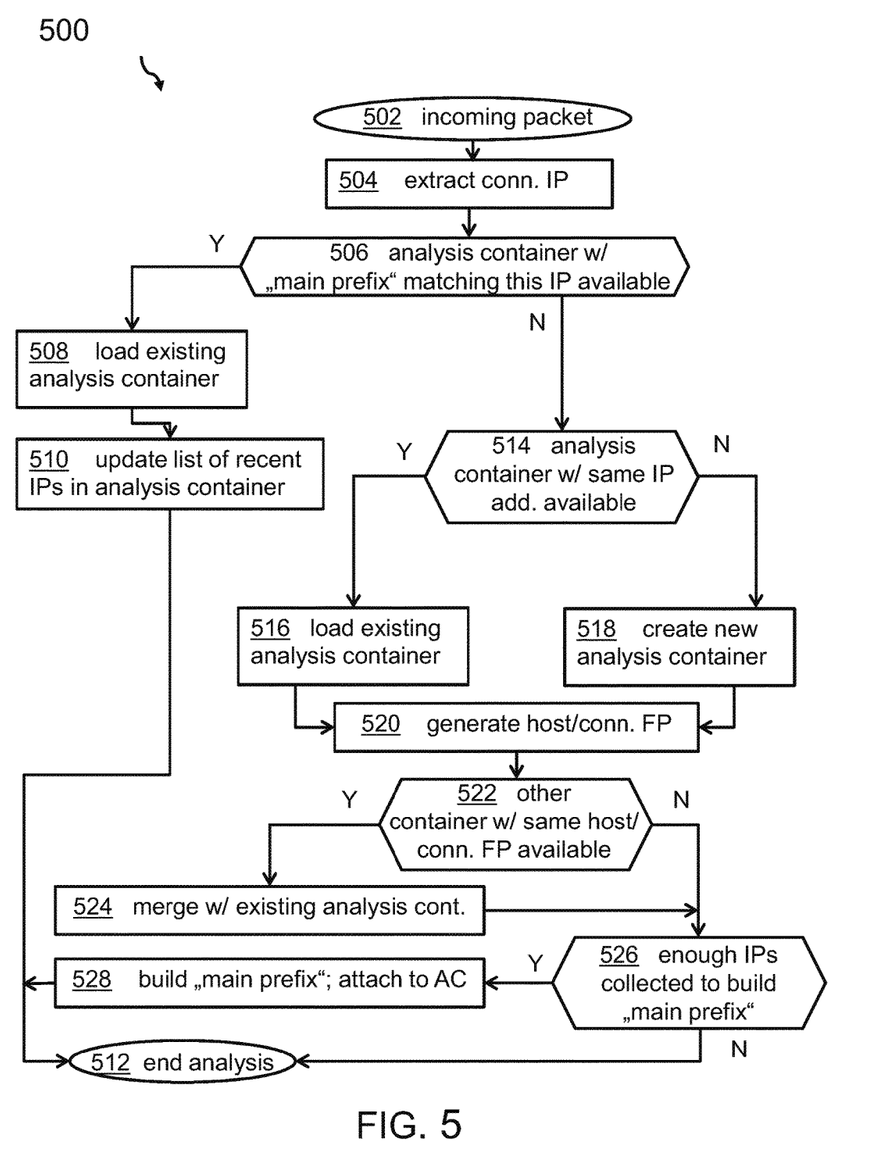
FIG. 5 shows a flowchart of an aggregation process, i.e., the process of merging the fingerprints into already existing fingerprints.

FIG. 5 shows a flowchart 500 of an aggregation process, i.e., the process of merging the fingerprints into already existing fingerprints.

From the incoming packet 502, the connection IP address is extracted, 504. Then, it is determined, 506, whether an analysis container with a "main prefix" matching the main prefix of the incoming packet 502 exists already. If that is the case—"yes" at 506—the existing analysis container comprising earlier received fingerprint data is loaded, 508, and the list of recent IP addresses is updated, 510, s in the analysis container. Then, the analysis ends, 512. It may be noted that the main prefix be determined as described in the context of FIG. 2.

In case the determination 506 about the "main prefix" results in a "no", it is determined, 514, whether an analysis container with the same IP address is available. In case of "yes" at 514, the available analysis container is loaded, 516; and in case of "no" at 514, a new analysis container is created, 518.

After the loading 516 or creation 518, the host/connection fingerprint is generated, 520. After that, it is determined, 522, whether another analysis container with the same host/connection fingerprint already exists. In case of "yes" at 522, a merge 524 with the existing analysis container id is performed and then it is determined, 526, whether enough—i.e., a predetermined number—of IP addresses have been collected to build the "main prefix". This is also done if the determination 522—whether an analysis container with the same host/connection/fingerprint is available—resulted in a "no".

If enough IP addresses are available—i.e., "yes" at 526—the "main prefix" is built and attached to the analysis container (AC), 528. Then, the process ends, 512. If enough IP addresses are not available—i.e., "no" at 526—the process ends, 512.

In the following, a more comprehensive technical example with concrete exemplary header data will be explained:

A spammer is using a server to send spam which has the IP address 2001:e42:102:1512:160:16:72:204. He tries to send spam to the target system. The connection interceptor is triggered and checks the blacklist for this IP address and the assumed prefixes 2001:e42:102:1512, 2001:e42:102, 2001:e42 (as of the generalization, the "main prefix"). It is not found and a fingerprint is computed, which is:

TABLE 1

| Item | Source of information |
|---|---|
| time received 2016☐07☐12T10:38Z | System TCP stack |
| sequence number 0 | IP header information |
| destination port 25 | IP header information |
| source port 48921 | IP header information |

TABLE 1-continued

| Item | Source of information |
|---|---|
| size 43 bytes | IP header information |
| packet type SYN | IP header information |
| OS Windows NT | pattern matching e.g., with p0f, https://en.wikipedia.org/wiki/P0f |

This data is stored in a new created analysis container. The SYN packet is followed by other packets that actually transfer a spam email. The fingerprint is continuously updated with new information gained from those. On closing the connection, the updated (merged) fingerprint data may look like:

TABLE 2

| Item | Source of information |
|---|---|
| time received 2016☐07☐12T10:38Z-2916-07-12T10:38:05Z | System TCP stack |
| sequence number 387 | IP header information |
| destination pott 25 | IP header information |
| source port 48921 | IP header information |
| size 7800 bytes | IP header information |
| packet type SYN, ACK, SYNACK, FIN | IP header information |
| OS Windows NT | pattern matching e.g., with p0f, https://en.wikipedia.org/wiki/P0f |
| fragmentation: no | IP header information |
| encryption: no | IP payload analysis |
| layer: 5 SMTP | IP payload analysis |
| content: spam e-mail | IPS |

The content classification leads to blacklisting this IP address, prefix and fingerprint. Thus, the spammer is not able to send spam successfully any longer to the protected system. Next, the spammer may take note and changes his IP address to 2001:e42:102:1513:3291:34:10:45 to be able to send spam again. The connection interceptor is then again triggered and checks the IP address with the blacklist, which does not return a positive result. Then, the prefix 2001:e42:102:1512 is checked, then 2001:e42:102, which returns the fingerprint as above in table 1. Now the fingerprint of the new connection is calculated as:

TABLE 3

| Item | Source of information |
|---|---|
| time received 2016☐07☐12T10:40Z | System TCP stack |
| sequence number 0 | IP header information |
| destination port 25 | IP header information |
| source port 48931 | IP header information |
| size 43 bytes | IP header information |
| packet type SYN | IP header information |
| OS Windows NT | pattern matching e.g., with p0f, https://en.wikipedia.org/wiki/P0f |

Both fingerprints are now compared. All entries match, as time received and source port are matched in a fuzzy fashion. The differences are small enough—below a predefined threshold value—to identify this as a nearly perfect match. Now, the merging happens, the fingerprint/analysis container is extended with the new information (time and port, and prefix), and the connection will be dropped. The new fingerprint is then:

TABLE 4

| Item | Source of information |
| --- | --- |
| time received 2016☐07☐12T10:38Z-2016☐07☐12T10:38:05Z, 2016☐07☐12T10:40Z | System TCP stack |
| sequence number 387, 0 | IP header information |
| destination port 25 | IP header information |
| source port 48921,48931 | IP header information |
| size 43 bytes | IP header information |
| packet type SYN, ACK, SYNACK, FIN | IP header information |
| OS Windows NT | pattern matching e.g., with p0f, https://en.wikipedia.org/wiki/P0f |
| fragmentation number: no | IP header information |
| encryption: no | IP payload analysis |
| layer: 5 SMTP | IP payload analysis |
| content: spam e-mail | IPS |

The analysis container will now contain also both IP addresses. This is repeated by the spammer for 3 more times, each time with a new host part and a slightly different prefix part, which will trigger the universal signature mechanism (fingerprint) which will trigger and change the prefix of the analysis container to 2001:e42:102:15xx.

Thus, an effective identification of the same fundamental source of the spam e-mail could be identified and blocked in an effective and resource conservative approach.

Figure 6:
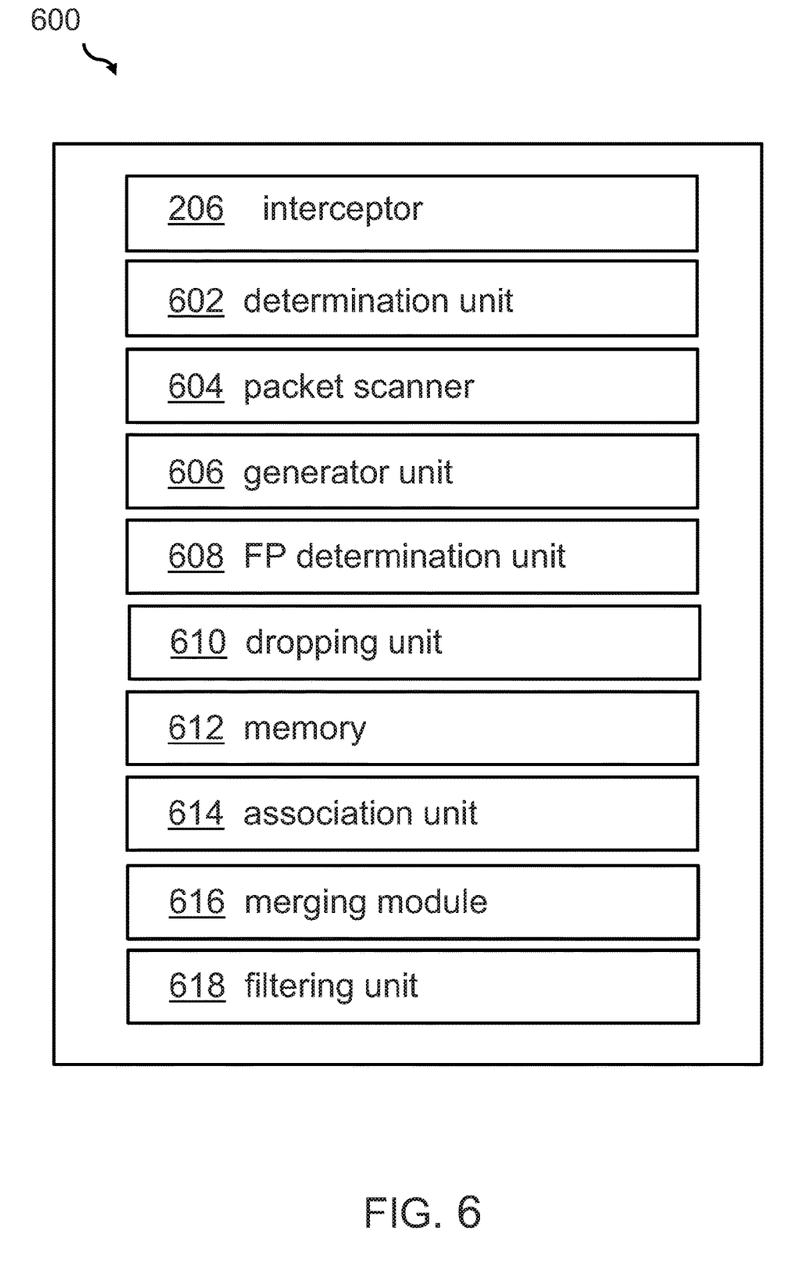
FIG. 6 shows an embodiment of a computing system comprising the system for blocking Internet Protocol connection addresses and prefixes.

FIG. 6 shows a block diagram of an embodiment of the system 600 for blocking Internet Protocol connection addresses and prefixes for a target system computer. The system comprises an interceptor 206 adapted for capturing an incoming connection request to a target system. The interceptor 206 is also adapted for extracting header information of the incoming connection request. A determination unit 602 is adapted for determining whether a portion of an Internet Protocol address comprised in the header information of the incoming connection request to the target system is blacklisted.

The system 600 comprises further a packet scanner 604 for adapted for activating a generator unit 606 adapted for generating a fingerprint based on structure and content of the request and the underlying physical connection, in case a portion of the Internet Protocol addresses is blacklisted.

A fingerprint (FP) determination unit 608 is adapted for determining whether the fingerprint is blacklisted and for activating a dropping unit 610 adapted for dropping the underlying connection in case the fingerprint is blacklisted.

A memory 612 unit is adapted for storing the received Internet Protocol request data in a buffer, and an association unit 614 adapted for associating the fingerprint to the request. Furthermore, a merging module 616 adapted for merging the request with already stored blacklisted requests of the related originating system relating to the request together with related fingerprint information, and a filtering unit 618 is adapted for filtering out shared prefixes of the Internet Protocol address of the stored blacklisted request if multiple Internet Protocol addresses have been detected for the same fingerprint and a predefined number of address bits of the related request are identical.

Figure 7:
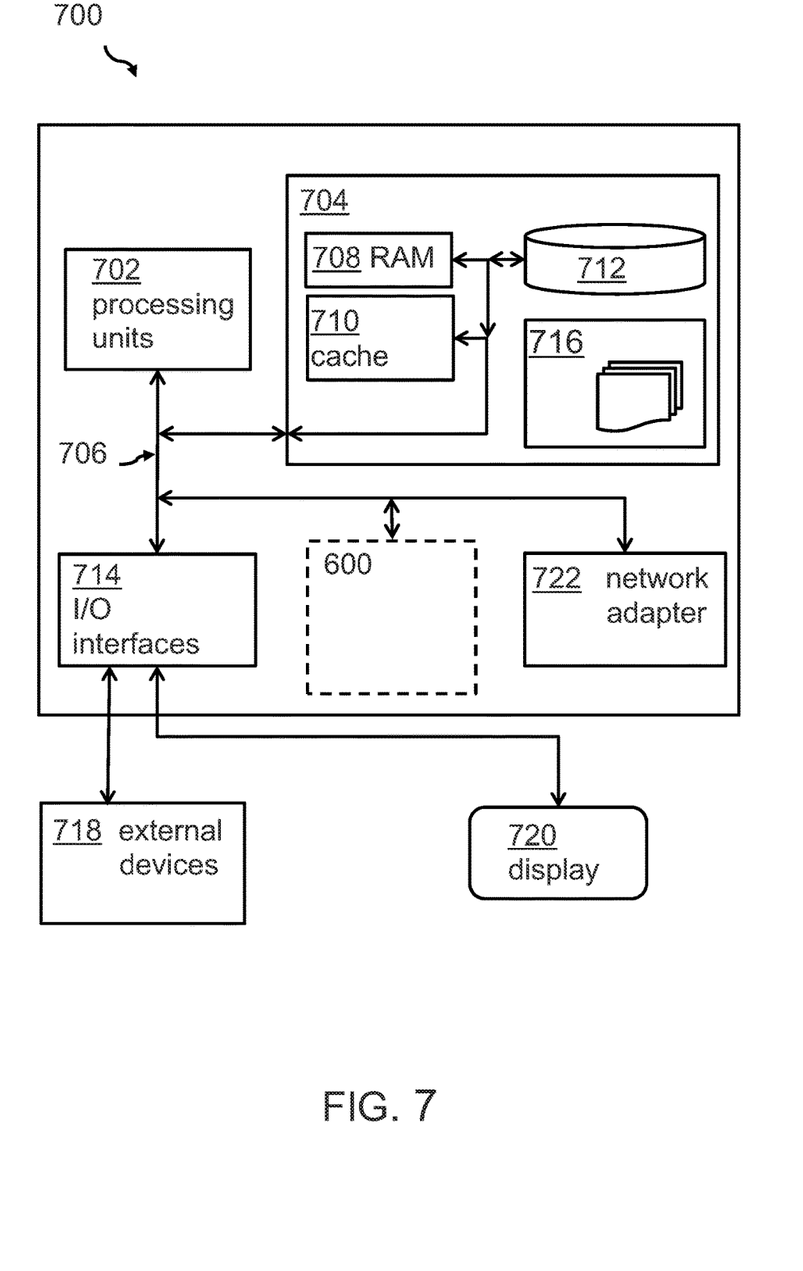
FIG. 7 shows a block diagram of a computer system which may be used in the context of the system according to FIG. 6 and/or the method according to FIGS. 1, 2, 4, 5.

Embodiments of the invention may be implemented together with virtually any type of computer, regardless of the platform being suitable for storing and/or executing program code. FIG. 7 shows, as an example, a computer system/server 700 suitable for executing program code related to the proposed method.

The computer system/server 700 is only one example of a suitable computer system and is not intended to suggest any limitation as to the scope of use or functionality of embodiments of the invention described herein. Regardless, computer system/server 700 is capable of being implemented and/or performing any of the functionality set forth hereinabove. In the computer system/server 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system/server 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus system 706 that couples various system components including system memory 704 to the processing units 702. Bus system 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus system 706 by one or more data media interfaces. As will be further depicted and described below, system memory 704 may include at least one program product having a set (e.g., at least one) of program modules that are configured to carry out the functions of embodiments of the invention.

The program/utility, having a set (at least one) of program modules 716, may be stored in system memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.: one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus system 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system for blocking Internet Protocol connection addresses and prefixes 600 may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an," and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for blocking Internet Protocol connection addresses and prefixes, the method comprising:
   capturing an incoming connection request to a target system;
   extracting header information of the incoming connection request;
   determining whether a portion of an Internet Protocol address comprised in the header information of the incoming connection request to the target system is blacklisted; and
   responsive to a portion of the Internet Protocol address being blacklisted:
      generating a fingerprint based on structure and content of the incoming connection request and an underlying physical connection;
      determining whether the fingerprint is blacklisted; and
      responsive to the fingerprint being blacklisted:
         dropping the underlying physical connection;
         storing data associated with the incoming connection request in a buffer;
         associating the fingerprint to the incoming connection request;
         merging the incoming connection request with stored blacklisted requests of a related originating system relating to the incoming connection request together with related fingerprint information; and
         filtering out shared prefixes of the Internet Protocol address of the stored blacklisted requests if multiple Internet Protocol addresses have been detected for a same fingerprint and a predefined number of address bits of related incoming connection requests are identical.

2. The method of claim 1, wherein storing the data associated with the incoming connection request in the buffer further comprises:
   storing a prefix of the Internet Protocol address or the complete Internet Protocol address; and
   storing related incoming packet payload.

3. The method of claim 2, wherein the fingerprint comprises metadata of the incoming connection request wherein the metadata comprises at least one selected out of the group comprising a time received, source Internet Protocol address, a destination Internet Protocol address sequence number, size and fragmentation setting an analysis container being a part of the buffer, kind of Internet Protocol packet, operating system and Internet Protocol, stack of sender, source port number, destination port number, encryption cipher, key length of encryption, algorithm of encryption, chain-of-trust of encryption, layer 5+ protocol, Web application protocol, a content type and a content classification.

4. The method of claim 1, wherein determining whether the portion of the Internet Protocol address comprised in the header information of the incoming connection request to the target system is blacklisted further comprises:
  determining whether the Internet Protocol address itself or an included prefix is blacklisted.

5. The method of claim 1, wherein determining whether the fingerprint is blacklisted further comprises:
  responsive to the fingerprint not being blacklisted, determining whether the incoming connection request to the fingerprint not being blacklisted is malicious; and
  responsive to the incoming connection request being malicious:
    dropping underlying physical connection; and
    indicating the Internet Protocol address and the related prefix as blacklisted.

6. The method of claim 1, wherein the Internet Protocol address is an IPv6 address.

7. The method of claim 1, wherein the predefined number of address hits is at least 32 bit long and wherein a related comparison of Internet protocol addresses starts from a left side of the Internet Protocol address.

8. The method of claim 3, wherein the analysis container is kept in memory until the underlying physical connection is dropped or a given amount of time has passed after a last writing into the analysis container.

9. The method of claim 1, wherein merging the incoming connection request with stored blacklisted requests comprises building a joint analysis request record if the incoming connection request and the stored blacklisted requests have a same address and wherein payload portions of the incoming connection request are stored in a chained manner even if related sequence numbers are not successive numbers.

10. The method of claim 1, further comprising:
  determining whether a connection payload of the incoming connection request is malicious; and
  responsive to the connection payload of the incoming connection request being malicious, dropping the underlying, physical connection and indicating the Internet Protocol address and a prefix of the Internet Protocol address or the fingerprint as blacklisted.

11. A system for blocking Internet Protocol connection addresses and prefixes, the system comprising:
  a processor; and
  a memory coupled to the processor, wherein the memory comprises instructions which, when executed by the processor, cause the processor to:
  capture an incoming connection request to a target system;
  extract header information of the incoming connection request;
  determine whether a portion of an Internet Protocol address comprised in the header information of the incoming connection request to the target system is blacklisted; and
  responsive to a portion of the Internet Protocol address being blacklisted:
    generate a fingerprint based on structure and content of the incoming connection request and an underlying physical connection;
    determine whether the fingerprint is blacklisted; and
    responsive to the fingerprint being blacklisted:
      drop the underlying physical connection;
      store data associated with the incoming connection request in a buffer;
      associate the fingerprint to the incoming connection request;
      merge the incoming connection request with stored blacklisted requests of a related originating system relating to the incoming connection request together with related fingerprint information; and
      filter out shared prefixes of the Internet Protocol address of the stored blacklisted requests if multiple Internet Protocol addresses have been detected for a same fingerprint and a predefined number of address bits of related incoming connection requests are identical.

12. The system of claim 11, wherein storing the data associated with the incoming connection request in the buffer further comprises:
  store a prefix of the Internet Protocol address or the complete Internet Protocol address; and
  store related incoming packet payload.

13. The system of claim 12, wherein the fingerprint comprises metadata of the incoming connection request, wherein the metadata comprises at least one selected out of the group comprising a time received, source Internet Protocol address, a destination Internet Protocol address sequence number, size and fragmentation setting an analysis container being a part of the buffer, kind of Internet Protocol packet, operating system and Internet Protocol stack of sender, source port number, destination port number, encryption cipher, key length of encryption, algorithm of encryption, chain-of-trust of encryption, layer 5+ protocol, Web application protocol, a content type and a content classification.

14. The system of claim 11, wherein the instructions to determine whether the portion of the Internet Protocol address comprised in the header information of the incoming connection request to the target system is blacklisted further causes the processor to:
  determine whether the Internet Protocol address itself or an included prefix is blacklisted.

15. The system of claim 11, wherein the instructions to determining whether the fingerprint is blacklisted further causes the processor to:
  responsive to the fingerprint not being blacklisted, determine whether the incoming connection request to the fingerprint not being blacklisted is malicious; and
  responsive to the incoming connection request being malicious:
    drop underlying physical connection; and
    indicate the Internet Protocol address and the related prefix as blacklisted.

16. The system of claim 11, wherein the Internet Protocol address, is an IPv6 address, wherein the predefined number of address bits is at least 32 bit long, and wherein a related comparison of Internet protocol addresses starts from a left side of the Internet Protocol address.

17. The system of claim 13, wherein the analysis container is kept in memory until the underlying physical connection is dropped or a given amount of time has passed after a last writing into the analysis container.

18. The system of claim 11, wherein the instructions to merge the incoming connection request with stored blacklisted requests further causes the processor to:
  build a joint analysis request record if the incoming connection request and the stored blacklisted requests have a same address, wherein payload portions of the incoming connection request are stored in a chained manner even if related sequence numbers are not successive numbers.

19. The system of claim 11, wherein the instructions further cause the processor to:
  determine whether a connection payload of the incoming connection request is malicious; and
  responsive to the connection payload of the incoming connection request being malicious, drop the underlying physical connection and indicating the Internet Protocol address and a prefix of the Internet Protocol address or the fingerprint as blacklisted.

20. A computer program product comprising a non-transitory computer readable storage medium having a computer readable program for blocking Internet Protocol connection addresses and prefixes stored therein, wherein the computer readable program, when executed on a computing device, causes the computing device to:
  capture an incoming connection request to a target system;
  extract header information of the incoming connection request;
  determine whether a portion of an Internet Protocol address comprised in the header information of the incoming connection request to the target system is blacklisted; and
  responsive to a portion of the Internet Protocol address being, blacklisted:
    generate a fingerprint based on structure and content of the incoming connection request and an underlying physical connection;
    determine whether the fingerprint is blacklisted; and
    responsive to the fingerprint being blacklisted:
      drop the underlying physical connection;
      store data associated with the incoming connection request in a buffer;
      associate the fingerprint to the incoming connection request;
      merge the incoming connection request with stored blacklisted requests of a related originating system relating to the incoming connection request together with related fingerprint information; and
      filter out shared prefixes of the Internet Protocol address of the stored blacklisted requests if multiple Internet Protocol addresses have been detected for a same fingerprint and a predefined number of address bits of related incoming connection requests are identical.

\* \* \* \* \*